United States Patent [19]
Reis

[11] 3,914,770
[45] Oct. 21, 1975

[54] TEMPERATURE CONTROL RECORDER

[75] Inventor: Robert D. Reis, Hingham, Mass.

[73] Assignee: United Electric Controls Company, Watertown, Mass.

[22] Filed: Apr. 8, 1974

[21] Appl. No.: 459,007

[52] U.S. Cl. .................. 346/17; 73/343.5; 73/368; 200/56 R; 346/123
[51] Int. Cl.² ........................................ G01D 13/26
[58] Field of Search ............... 346/17, 25, 33 TP, 72, 346/121, 123; 73/368, 262.1, 343.5; 200/56 R, 56 A

[56] References Cited
UNITED STATES PATENTS

| 1,969,158 | 8/1934 | Side | 200/56 A |
| 3,144,771 | 8/1964 | Leupold | 73/368 |
| 3,673,608 | 6/1972 | Voorman | 346/18 |

*Primary Examiner*—Joseph W. Hartary
*Attorney, Agent, or Firm*—Robert T. Gammons

[57] ABSTRACT

A temperature control comprising one or more switches, having actuating pins, a rocker supported with one end adjacent the actuating pins, a fluid operable motor responsive to temperature changes supported in operating relation to the other end of the rocker for effecting movement of the one end of the rocker in a direction to engage the actuating pins, a support supporting the switches for movement relative to the rocker, a manually operable cam for effecting movement of the rocker support to set the switches for operation at a predetermined temperature, a fixed temperature scale, indicators supported on a common axis for movement along the scale, a linkage connecting one of said indicators to said switch support so that the setting selected by the manually operable cam is indicated on the scale, a linkage connecting the other indicator to the rocker so that the temperature at any given time is indicated on the scale, a chart bearing temperature and time scales, a motor connected to the chart for rotating it at a predetermined rate, a scriber supported in engagement with the chart and linkage connecting the scriber to said rocker for movement in consonance with said other indicator to record the temperature on the chart.

16 Claims, 9 Drawing Figures

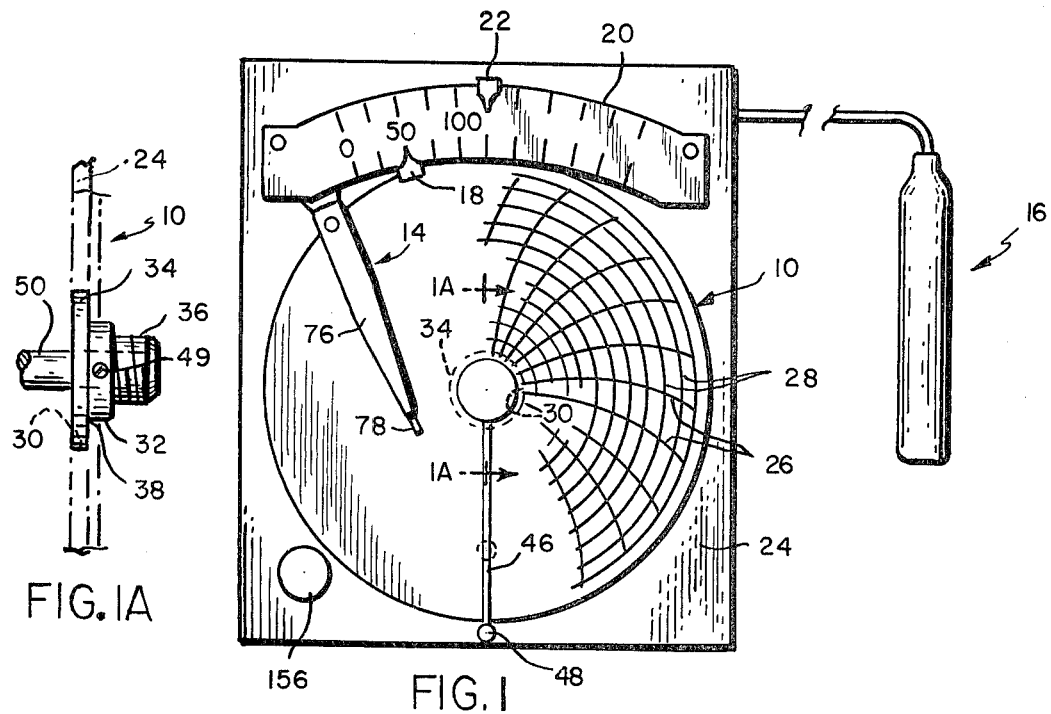
FIG. 1A
FIG. 1
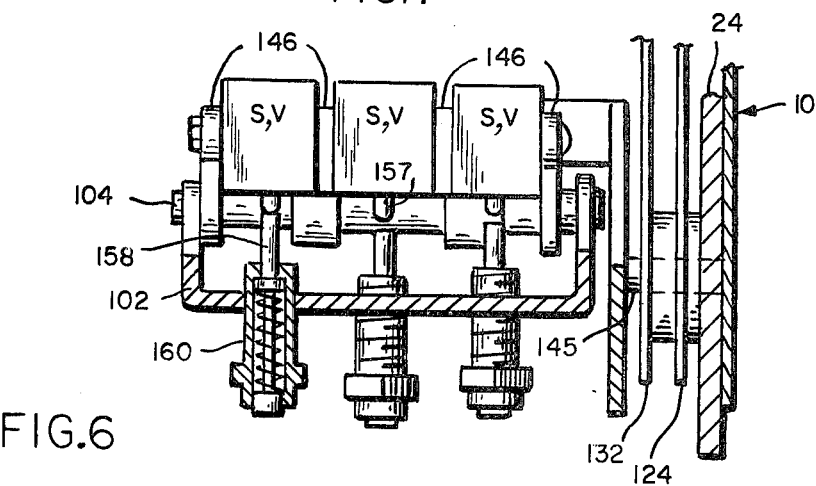
FIG. 6
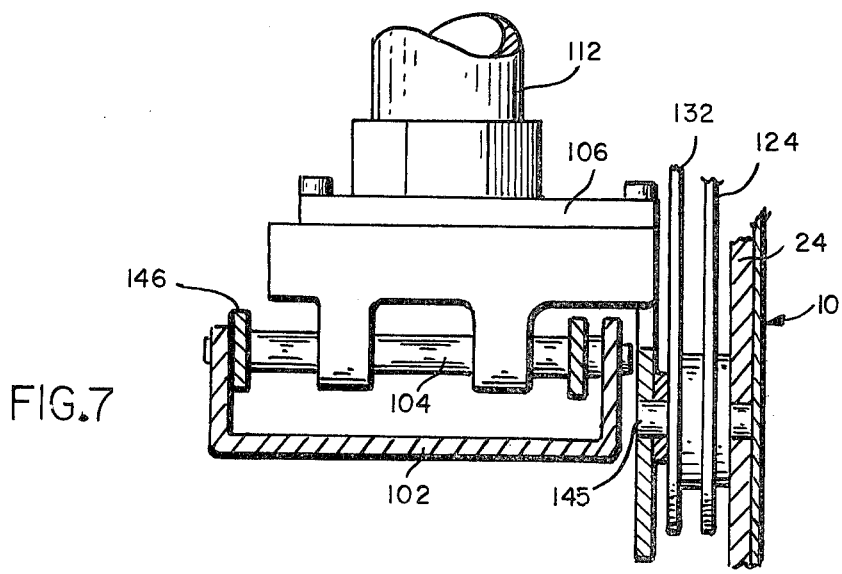
FIG. 7

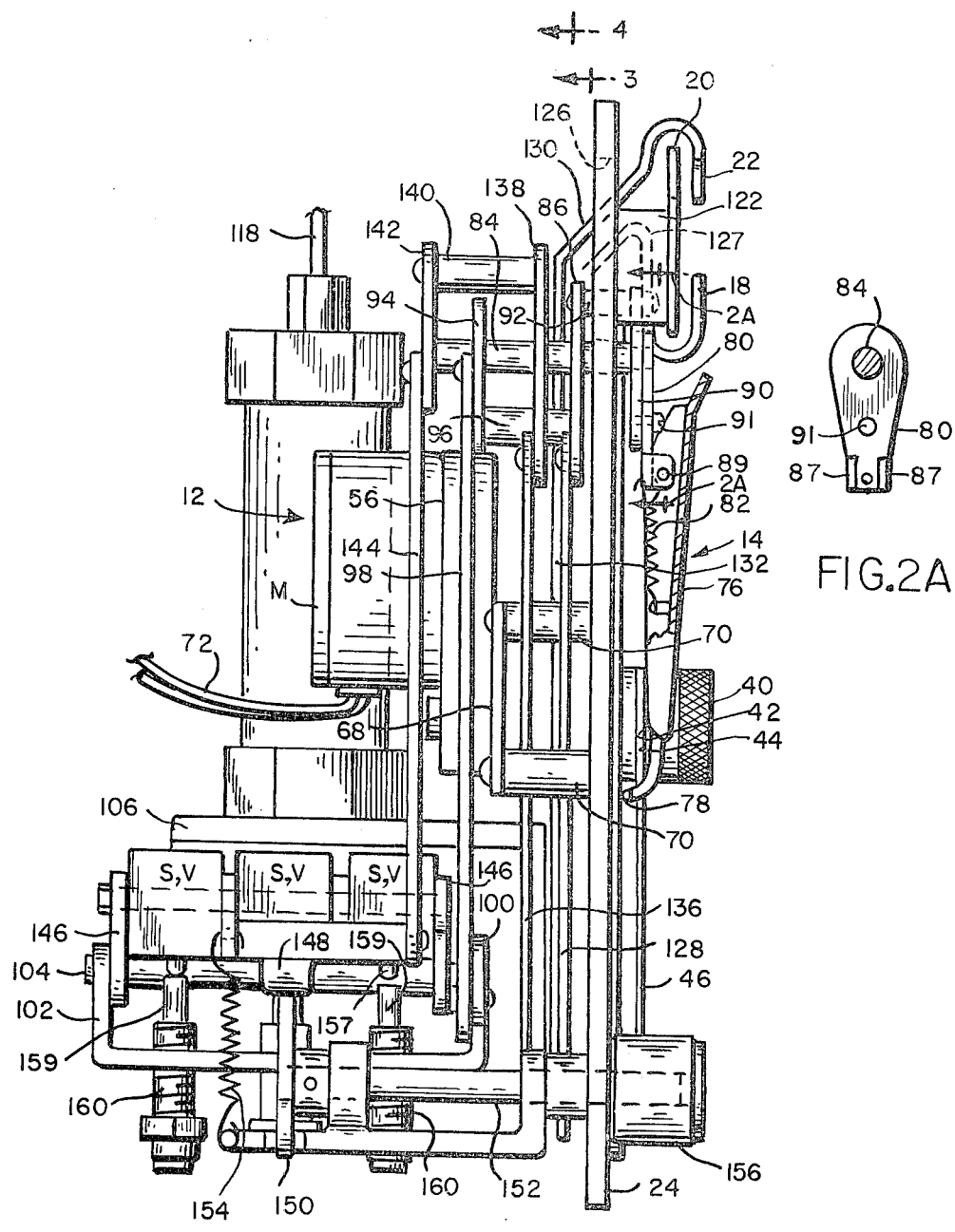

TEMPERATURE CONTROL RECORDER

BACKGROUND OF INVENTION

Indicators of the general type of that disclosed herein form the subject matter of U.S. patents to Leupold U.S. Pat. No. 3,144,771 and Barter U.S. Pat. No. 3,404,945 which are assigned to United Electric Controls Company, assignee of the subject matter of the instant application. The control of this invention is designed to eliminate the backlash inherent in such instruments as shown in the aforesaid patents wherein rack and pinion means are employed for transmitting the operation of the motor to the scriber and indicator and provide for more economical manufacture by substitution for the rack and pinion means parts which are not critical and therefore are not costly to manufacture.

SUMMARY OF INVENTION

A temperature control for regulating and controlling temperature comprising control means, an actuator supported adjacent the control means, a temperature responsive motor operable to effect movement of the actuator in a direction to effect operation of the control means, means supporting the control means for movement relative to the actuator to set the control means for operation at a predetermined temperature, manually operable means for effecting movement of the control means, a fixed temperature scale, indicators rotatably supported on a common axis for movement along the temperature scale, linkage connecting one of the indicators to said manually operable means so that the selected setting for operation of the control means is indicated on the scale, linkage connecting the other indicator to the temperature responsive motor so that response of the temperature responsive motor to changes in temperature are indicated on the scale, a chart bearing temperature and time scales, a motor connected to the chart for rotating at a predetermined rate, a scriber supported in engagement with the chart and linkage connecting the scriber to said temperature responsive motor for movement on the chart in consonance with the movement of said other indicator. The actuator comprises a pivotally supported rocker supported with one end adjacent to the control means and with its opposite end adjacent the temperature responsive motor such that operation of the motor effects movement of the one end of the rocker in a direction to actuate the control means. The manually operable means comprising a cam fixed to a shaft provided with a knob by means of which it may be rotated with which the support for the control means is held engaged by a spring. The control means comprises two or more switches or valves provided with actuating pins extending toward the rocker and there are a corresponding number of posts on the rocker arranged to engage the actuating pins. The posts are independently adjustable on the rocker to engage the pins simultaneously or successively and are yieldably supported to provide for overtravel of the rocker. The linkage comprises four links, two of which are connected respectively to the rocker and support for the control means and two of which are connected respectively to the indicators, a fixed shaft on which the pen arm is pivotally supported, a first crank on the fixed shaft connected to the link which is connected to the rocker, a second crank on the fixed shaft connected to the pen arm and to said other indicator, means connecting the first and second cranks to each other for movement in unison, a third crank on the fixed shaft connected to the link which is connected to the manually adjustable means, a fourth crank on the fixed shaft connected to the first indicator and means connecting the third and fourth cranks to each other for movement in unison.

The invention will now be described in greater detail with reference to the accompanying drawings wherein:

FIG. 1 is a view showing the face of the instrument and a sensing bulb at the end of a flexible capillary tube of suitable length such that it may be placed in the chamber or other area wherein the temperature and time are to be recorded:

FIG. 1A is a section taken on the line 1A—1A of FIG. 1;

FIG. 2 is an enlarged side view as seen from the left side of FIG. 1;

FIG. 2A is a section taken on the line 2A—2A of FIG. 2;

FIG. 6 is a fragmentary section taken on the line 6—6 of FIG. 3; and

FIG. 7 is a fragmentary elevation taken on the line 7—7 of FIG. 3.

Figure 3:
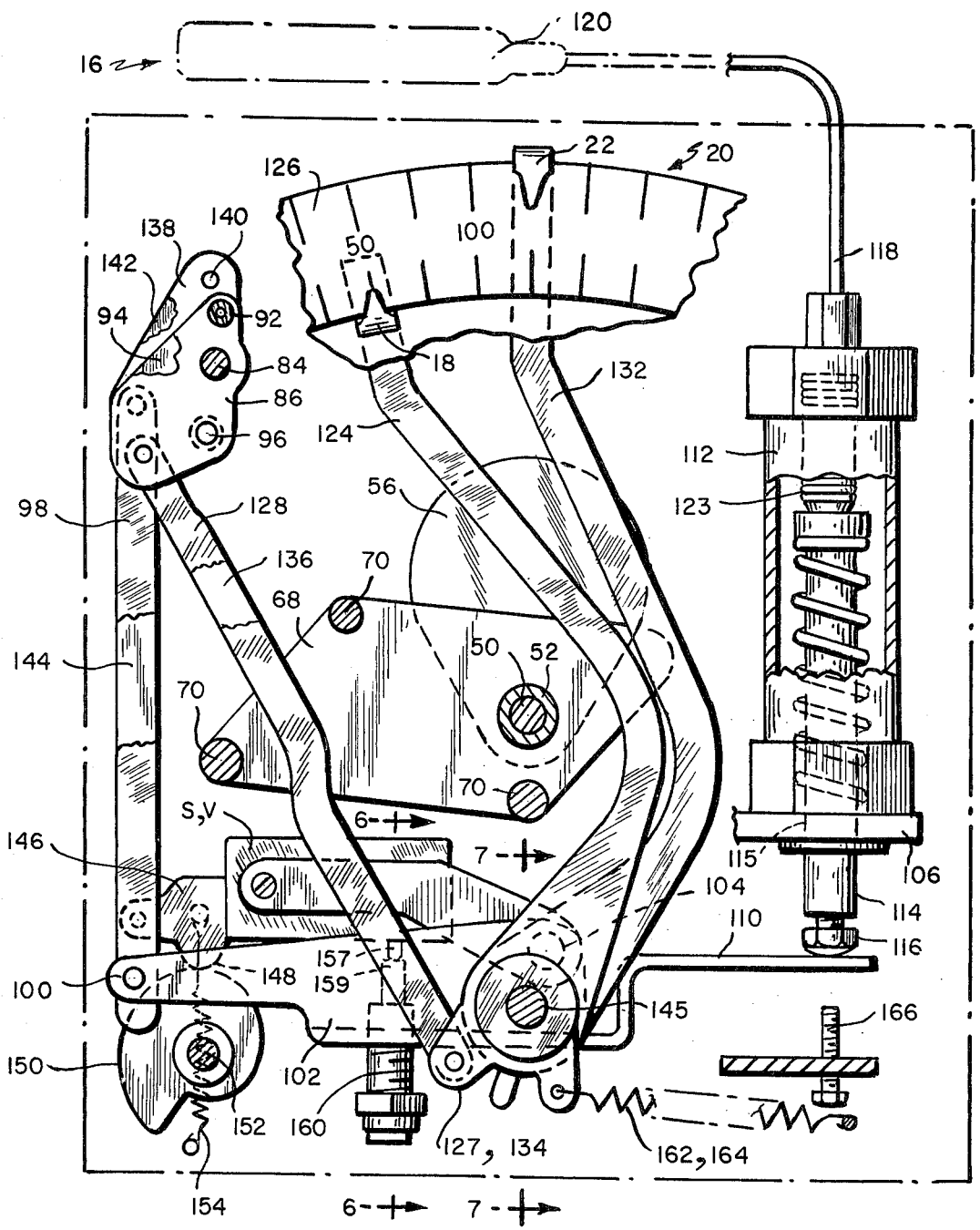
FIG. 3 is an elevation taken on the line 3—3 of FIG. 2.

As herein illustrated the instrument is provided with a chart 10, FIGS. 1 and 1A which is mounted on the face of a rigid metal supporting plate 24 and has on its face a plurality of arcuate radially extending lines 26 uniformly spaced about the center of the chart which represents a 24 hour period and concentrically arranged radially spaced lines 28 which represent temperature changes and specifically as herein illustrated a temperature range from zero to 250°F. The face of the plate 24 is flat and contains a central opening 30 in which there is rotatably mounted a hub 32 having a radial flange 34 and a threaded portion 36. The hub 32 is designed to receive the chart 10 which itself contains a central hole 38 adapted to fit snugly on to the hub 32. A knurled nut 40 is threaded onto the threaded portion 36 against the chart to hold it on the hub against the flange 34. To avoid loss of the knurled nut 40, the latter contains a peripheral groove 42, FIG. 2 within which is engaged a loop 44 at one end of the wire 46. The other end of the wire 46 is pivotally secured by a pin 48 to the lower edge of the cover plate 24 so that when the knurled nut is removed for the purpose of replacing the chart it may be dropped below the plate to an out of the way position and retrieved without becoming lost.

Figure 5:
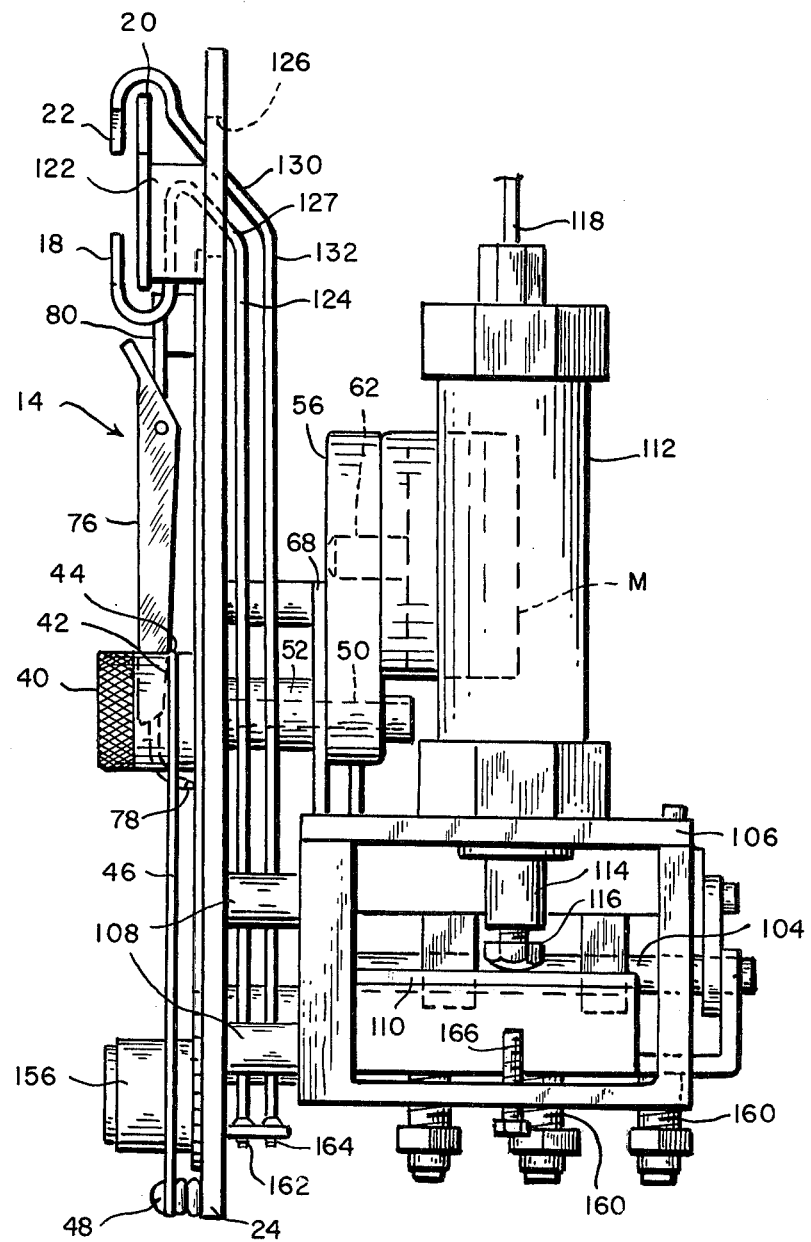
FIG. 5 is an elevation taken from the right side of FIG. 1.

The hub 32 is secured by means of a set screw 49 to a shaft 50, FIG. 1A which extends rearwardly therefrom through the plate 24 and through a bearing sleeve 52, FIG. 5 cast on the rear side of the plate into a gear box 56 and has on it within the gear box suitable reduction gearing which is driven by the shaft 62 of a motor M. The gear box 56 is supported at the rear side of the plate 24 by bracket plate 68 which in turn is mounted in spaced parallel relation to the back of the plate 24 by rearwardly extending studs 70, three such studs being used for this purpose FIG. 2. The motor M is secured to the tear side of the gear box. Conductors 72 provide for supplying power to the motor. Thus the chart is turned when the instrument is in operation by motor M at a predetermined rate, for example, once every 24 hours or once every seven days.

A pen assembly 14, FIG. 2, and 2A is mounted on the face of the plate 24 comprising an arm 76 which is supported for movement parallel to the surface of the chart and has at its distal end a scriber 78 which is spring pressed against the surface of the chart so that as it is moved across the chart it traces a line on the surface of the chart which represents time and temperature. The pen arm is pivotally fastened at its upper end to the lower end of a stirrup 80 for pivotal movement about an axis parallel to the face of the plate and is spring biased toward the plate by a spring 82 connected at one end to the stirrup and at its other end to the pen arm. The stirrup 80 is rotatably mounted on a fixed shaft 84 which extends rearwardly through the plate 24 and has secured to it at the rear side of the plate 24 a crank plate 86. There is also mounted on the shaft 84 at the front side of the plate for rotation thereon a crank plate 90. A pin 92 is pivotally connected at one end to the upper end of the crank plate 90 and its other end extends rearwardly thereof through the plate and is connected to the crank plate 86. The stirrup has forwardly projecting ears 87—87, FIG. 2A for receiving a pivot pin 89 on which the pen arm is pivotally supported. A screw 91 fixes the stirrup to the crank plate 90. A third crank plate 94 is also rotatably mounted on the shaft 84 and this crank plate is connected by a pin 96 to the crank plate 86. A link 98, FIG. 3, is pivotally connected at its upper end to the crank plate 94 and the lower end of the link 98 is pivotally connected to the forward end of an arm 100 which comprises part of a rocker 102, FIGS. 2 and 3 pivotally mounted on a shaft 104, the latter being supported at the rear side of the plate with its axis perpendicular thereto by a casting 106, FIGS. 2, 5 and 7 which in turn is secured to the rear side of the plate by two studs 108—108. The rocker 102 has extending rearwardly from the shaft 104 an arm 110 by means of which the rocker may be rocked. A motor cylinder 112 is secured to the casting 106 in a vertical position from the lower end of which extends a rod 114. The rod 114 extending through a hole 115, FIG. 3 in the casting and has at its lower end an adjustably threaded button 116 which is held engaged with the arm 110. The upper end of the motor cylinder 112 is connected by a flexible capillary tube 118 of suitable length to a stainless steel bulb 120 filled with an expandable liquid. The flexible capillary tube 118 enables placing the bulb in the chamber where the temperature is to be recorded and/or controlled. Expansion of the fluid in the bulb will cause expansion of a bellows 123 in the motor cylinder 112 so as to extend the rod 114 and hence rock the rocker on its shaft. This in turn through the linkage 98, 94, 86, 92, 90, 80 will cause the pen arm to move across the chart. The pen arm is spring biased toward the center of the chart as will appear hereinafter and is moved outwardly on the chart toward the periphery as the temperature rises.

Figure 4:
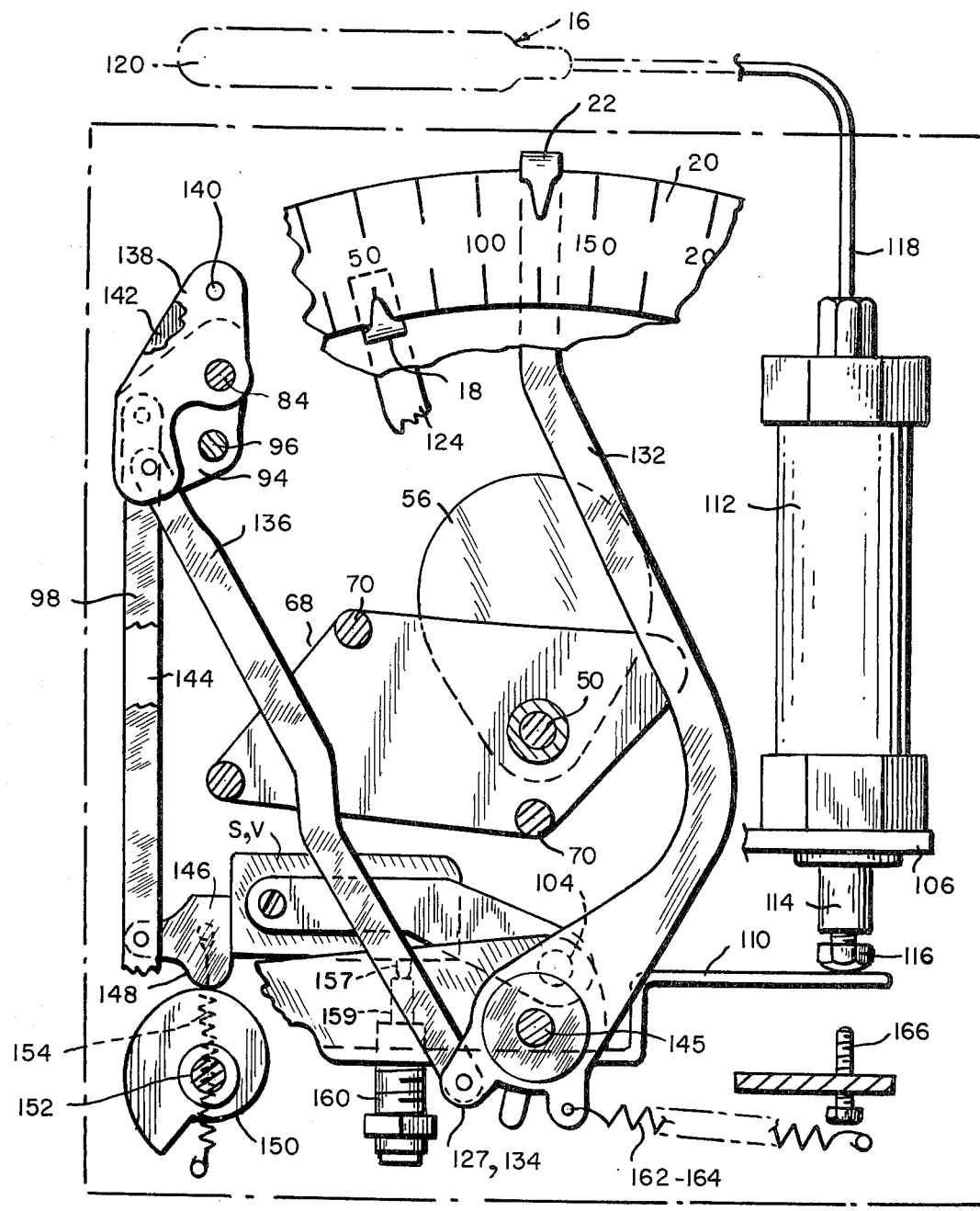
FIG. 4 is an elevation taken on the line 4—4 of FIG. 2.

It is desirable that as the pen arm moves across the chart to make a record thereon that the temperature recorded at any instant of time be clearly visible to the naked eye without having to read the chart which is essentially for the purpose of keeping a record over a 24 hour period. Accordingly, there is mounted above the chart, FIG. 1, 3 and 4 in more or less concentric relation thereto an arcuate graduated scale plate 20, the latter being mounted forwardly of the face of the plate 24 in spaced parallel relation thereto on spacers 122—122, FIGS. 2 and 5 cast on the plate. The scale plate 20 is graduated to correspond with the graduation on the chart. The indicator 18 which shows the temperature at any given instant moves along the lower scale on the scale plate and is connected for such movement to the upper end of a lever 124 at the rear side of the plate 24. A slot 126, FIGS. 2 and 5 is provided in the plate 24 for receiving a stem 127 which extends rearwardly from the indicator 18 to the upper end of the lever 124. The lower end of the lever 124 is rotatably mounted on one end of a stub shaft 145 fixed to the casting and has on its pivoted end a lug 127 which has pivotally connected to it the lower end of a link 128. The opposite upper end of the link 128 is pivotally connected to the crank plate 86 so that rotation of the crank plate 86 through the link 128 imparts movement to the arm 124 and to the indicator 18 which corresponds to the movement of the pen arm over the chart.

The control is provided for by a bank of switches or valves S, V which can be set to become actuated at a predetermined temperature simultaneously or in sequence. An indicator 22 is arranged to be moved along the upper scale on the scale plate to indicate the predetermined temperature selected. The indicator 22 has a stem 130, FIGS. 2 and 5 extending rearwardly from it through the slot 126 in the cover plate which is connected to the upper end of a lever 132 at the rear side of the cover plate. The lower end of the lever 132 is pivotally mounted on the shaft 145 and has extending from it a lug 134 which is connected to the lower end of a link 136. The upper end of the link 136 is pivotally connected to a crank plate 138 pivotally mounted on the shaft 84 and this is connected by a pin 140 to a crank plate 142 also on the shaft 84. This latter crank plate 142 is pivotally connected to the upper end of a link 144 the lower end of which is connected to an arm 146 pivotally supported on the shaft 104 for movement relative to the rocker. The distal end of the arm 146 has at its lower side a part 148 arranged to bear upon the peripheral edge of a cam 150 rotatably supported on a shaft 152 and is held engaged therewith by a spring 154. The shaft 152 extends forwardly through the plate and has fixed to it a knurled knob 156, FIG. 2, so that by rotating the shaft 152 the arm 146 may be moved relative to the rocker and the indicator 22 may be moved along the scale.

The arm 146 supports one or more switches or valves S or V, FIGS. 2 and 6 above the rocker 102 with their actuating element 156 extending downwardly toward the rocker. There may be two or more arms 146 so as to support more than one switch or valve. The arm or arms 146 supporting the switches or valves are pivotally movable about the axis of the shaft 104 relative to the rocker so that it is possible by rotating the cam 150 to raise and lower the switches and/or valves relative to the rocker to set the switches or valves for operation at a predetermined temperature. An adjustable pin or pins 159 are mounted on the rocker below the actuating pins 157 being fixed to the upper ends of threaded studs 160 screwed into the rocker. By adjustment of the heightwise position of each pin 159 the moment it will actuate an actuator pin 157 can be predetermined so that as the rocker is rocked by a rise or fall in temperature it will engage and/or disengage the actuating pin of a switch or valve at a predetermined time either simultaneously with the other switches or in some other order. Selection of the temperature at which the switches or valves will be actuated is visably indicated by the position of the indicator 22 on the scale plate 20.

Springs 162, 164 bias the arms 124, 132 toward their zero positions on the scale plate and a limit pin 166 limits the downward movement of the rocker.

As thus constructed the control may be adjusted for a given temperature by movement of the indicator 22 along the scale which is effected by rotation of the knob 156 on the face of the plate 24 thus determining the initial distance between the switch actuating pin 159 and the upper ends of the pin 159 supported by the rocker. A rise in temperature in the ambient medium surrounding the bulb 120 will result in downward displacement of the rod 114 and thus rock the rocker arm 102 downwardly in a clockwise direction as shown in FIG. 3 with a corresponding upward movement of the arm. This movement of the rocker through the linkage described heretofore rotates the cranks 94 and 90 which respectively swing the indicator 18 over on the scale and scriber over the chart so as to trace the course of the indicator as it travels along the scale. If the temperature rises until the indicator 18 coincides with the indicator 22 the actuators 158 will be elevated sufficiently to actuate the switch pin to in turn actuate the switches or valves and through suitable circuitry not shown reduce the source of heat so that the medium surrounding the bulb 120 will then remain at the same temperature or become cooler and in the latter case the indicator element 18 will move backwardly down the scale, its course being traced on the chart by the scriber and eventually the switch pins will be permitted to move downwardly thus deactuating the switches and again energizing the source of heat.

The linkages employed for transmitting motion from part to part are of fixed length thus eliminating backlash which is inherent in rack and pinion movements and they are comprised of sheet metal which is susceptible of stamping operations and hence economy in manufacturing costs.

An appropriate box not shown is provided to house the operating parts of the instrument having an open side to which the plate 24 is adaptable to be secured by screws.

It should be understood that the present disclosure is for the purpose of illustration only and includes all modifications or improvements which fall within the scope of the appended claims.

I claim:

1. A temperature control for regulating and recording temperature comprising control means, a pivotally supported rocker supported with one end adjacent the control means, a temperature responsive motor supported adjacent the other end of the rocker operable by engagement with said other end to move the one end in a direction to actuate the control means, means supporting the control means for movement relative to said one end of the rocker to set the control means for operation at a predetermined temperature, manually operable means for effecting movement of the control means relative to said one end of the rocker, a fixed temperature scale, indicators pivotally supported on a common axis for movement along said fixed temperature scale, linkage connecting one of the indicators to said manually operable means so that the setting selected by said manually operable means is indicated on the scale, linkage connecting the other indicator to the rocker so that the temperature at any given time is indicated on said scale, a chart bearing temperature and time scales, a motor connected to the chart for rotating it at a predetermined rate, a scriber supported in engagement with the chart and linkage connecting the scriber to said one end of the rocker for movement in consonance with said other indicator as the latter moves along the scale to trace the temperature on the chart.

2. A control according to claim 1 comprising means for limiting tilting movement of the rocker.

3. A control according to claim 2 comprising means for adjusting the means for limiting the tilting movement of the rocker.

4. A control means according to claim 1 wherein the manually operable means comprises a cam with which the control support is held engaged, a shaft to which the cam is fixed and a knob fixed to the shaft for effecting rotation thereof.

5. A control according to claim 4 comprising a spring yieldably holding the control support engaged with said cam.

6. A control means according to claim 1 wherein the rocker and the support for the control means are pivotally supported for movement about a common axis.

7. A control means according to claim 1 wherein there is means yieldingly mounted on the one end of the rocker for engagement with the control means, said yieldably mounted means providing for over-travel of the rocker.

8. A control means according to claim 1 wherein the control means comprises a switch having an operating pin extending toward said one end of the rocker and a yieldably mounted post on one end of the rocker for engagment with the operating pin.

9. A control means according to claim 8 wherein the post is adjustably mounted on the rocker.

10. A control means according to claim 1 wherein the control means comprises two or more switches or valves having actuating pins extending toward the rocker and there are a corresponding number of posts on the rocker arranged to engage said actuating pin.

11. A control means according to claim 10 wherein the posts are independently adjustable on the rocker to engage the actuating pins simultaneously or successively.

12. A control means according to claim 1 characterized in that the linkage comprises four links two of which are connected respectively to the rocker and support for the control means and two of which are connected respectively to the indicators, a fixed shaft on which the pen arm is rotatably supported, a first crank on the fixed shaft connected to the link which is connected to the rocker, a second crank on the fixed shaft connected to the pen arm and to said other indicator, means connecting the first and second cranks to each other for movement in unison, a third crank on the fixed shaft connected to the link which is connected to the manually adjustable means, a fourth crank on the fixed shaft connected to the first indicator and means connecting the third and fourth cranks to each other for movement in unison.

13. A control means according to claim 1 wherein the scriber is reversably movable on the chart and is arranged to travel outwardly from the center of the chart toward the circumference, such outward travel describing a decreasing temperature.

14. A control means according to claim 1 wherein the scriber marks the chart by pressure.

15. A control means according to claim 1 wherein spring means is connected to the linkage for the scriber such as to bias the scriber to a zero position.

16. A control means according to claim 1 wherein the scriber is supported for movement in a plane parallel to the chart on a shaft spaced from and parallel to the axis of rotation of the chart, a stirrup supporting the scriber on the shaft for pivotal movement about an axis parallel to the shaft, and a spring biasing the scriber towards the chart.

* * * * *